United States Patent [19]

Brugarolas et al.

[11] Patent Number: 5,039,360

[45] Date of Patent: Aug. 13, 1991

[54] METHOD FOR COATING HOT METAL SURFACES

[75] Inventors: Juan F. Brugarolas; Federico S. Rodellas, both of Rubi, Spain

[73] Assignee: Procoat S.A., Rubi, Spain

[21] Appl. No.: 244,550

[22] Filed: Sep. 12, 1988

Related U.S. Application Data

[62] Division of Ser. No. 44,745, May 1, 1987, abandoned.

[30] Foreign Application Priority Data

Oct. 21, 1986 [EP] European Pat. Off. ......... 86114574.6

[51] Int. Cl.$^5$ .............................................. C23C 22/33
[52] U.S. Cl. ..................................... 148/251; 148/258
[58] Field of Search ........................................ 148/251

[56] References Cited

U.S. PATENT DOCUMENTS

| | | | |
|---|---|---|---|
| 3,063,877 | 11/1962 | Schiffman | 148/6.2 |
| 3,132,055 | 5/1964 | Tanaka | 148/6.2 |
| 3,140,204 | 7/1984 | Tokunaga | 148/6.2 |
| 3,185,596 | 5/1965 | Schiffman | 148/6.16 |
| 3,346,522 | 10/1967 | Schuster | 148/6.2 |
| 3,413,158 | 11/1968 | Inouye | 148/6.2 |
| 3,595,704 | 7/1971 | Matsuda | 148/6.2 |
| 4,006,041 | 2/1977 | Bruganolas | 148/6.16 |
| 4,170,671 | 10/1979 | Hirasawa | 148/6.2 |
| 4,373,968 | 2/1983 | Hess | 148/6.2 |
| 4,637,839 | 1/1987 | Hall | 148/6.2 |
| 4,650,527 | 3/1987 | Ishii | 148/6.2 |
| 4,671,825 | 6/1987 | Ishii | 148/251 |
| 4,761,187 | 8/1989 | Mady | 148/251 |

*Primary Examiner*—Sam Silverberg
*Attorney, Agent, or Firm*—Fleit, Jacobson, Cohn, Price, Holman & Stern

[57] ABSTRACT

A method for coating a metal surface includes heating an untreated metal surface to a temperature of about 40° C. to 250° C. and spraying a coating composition onto the hot untreated metal surface, while continuously moving the metal surface, so that a corrosion resistant coating is formed on the surface, the coating composition having a pH of 0.5 to 1.5 and containing; (a) 20 to 40% by weight acrylic organic polymer in aqueous dispersion; (b) 1 to 5% by weight chromium in a soluble form and selected from the group of hexavalent chromium and mixtures of hexavalent and trivalent chromium wherein the trivalent is about 0.1 to 20% by weight of the total chromium in the mixture; (c) 1.5 to 4% by weight phosphoric acid; and (d) 0.1 to 1.5% by weight organic reducing agent.

14 Claims, No Drawings

METHOD FOR COATING HOT METAL SURFACES

This is a divisional of application Ser. No. 07/044,745, filed May 1, 1987 now abandoned.

BACKGROUND OF THE INVENTION

In an industrial process the coating of metals with paints by means of a gun process, is generally made onto cold surfaces, and when requiring a certain quality degree, it must be performed with a prior treatment of chemical conversion.

The metal surface must be cold, as on the contrary the extensibility of the paint and consequently its finishing will be defficient. It is possible however that adjusting adequatly the composition of the solvents, to obtain an adequate finishing, and in fact this procedure is sometimes used. If the paints contain any solvent of low volatility, it is necessary to foresee the formation of the vapors of this solvent with the corresponding riks of ambient contamination and fire. Normally, even the named waterborne paints contain a high percentage of cosolvents of organic nature, which will be volatilized during the drying of the paint.

The chemical conversion of the metal surface has the purpose of providing a higher adhesion of the paint onto the metal surface, and at the same time improving the qualities of anticorrosive protection. Depending on the nature of the metal surface, different baths will be used, so that for steel and zinc phosphate solutions are used, such as zinc, iron, manganese, and for aluminium phosphate or chromate baths are used. In any case there will be a minimum of three steps comprehending the chemical conversion, a rinsing to remove the excess of solution not reacted with the metal, and a last rinsing generally containing Cr6 and Cr3. It is evident that the chemical conversion process is very complex, requiring facilities of space, and energy consumption, as the baths act normally in hot, (high waterconsumption and depuration because of its content in chrome ions).

Although it is true that some paints are applied by gun spraying, onto hot metal surfaces, not exceeding however in general 40° C., the conjunction of the hot surface, even up to 250° C. and the suppression of the prior chemical conversion, it has not yet been a well-known or used technique, when requiring a proper finishing, adherence, mechanical qualities and an anticorrosive resistance, not under the quality standards normally accepted.

Present Patent describes a composition to coat hot metal surfaces, without chemical conversion, which applied by a gun spraying system, enables to obtain a proper surface finishing, and some mechanical characteristics similar to most reputable conventional sistems.

One of the advantages of present Patent is based on the fact that the chemical conversion process of the metal surface requires a drying at the end of the process, to remove any humidity remaining trace. If not being so, paint would not spread to coat the surface properly, if it would still remain wet. Even if using waterborne paints, drying will be performed, in order to obtain highest qualities of the paint layer. The metal surface acquires therefore a certain temperature, normally over 80 and 120 deg. C. Before painting, the surface cools reaching room temperature, to obtain a good extensibility and prevent the emission of vapors from solvents. Afterwards it is heatened again, between 130° and 190° C. to obtain the reticulation of the film.

In other industrial processes, the surface high temperatures, as a consequence of a prior treatment originating a caloric contribution. The shotblasting systems used in the prior surface cleaning, the galvanizing, that is the coating of a steel material with zinc, by dipping in molten metals, as well as other processes like drawing, rolling, etc, also originate a temperature elevation.

Present Patent enables to take advantage of the calories the material receives, in a drying operation or in the operative process, as the product can be applied onto hot surfaces. If the material temperature is under 160° C., which is the reticulation temperature of the film laid as per present patent, there will be a lower energy consumption as compared to a conventional system, as there the material generally at room temperature. If being over 160° C., as per the thickness of the paint to apply and the specific mass of the material, this temperature can be sufficient to obtain the film reticulation. It is obvious that when higher is the material temperature, greater will be its specific mass, and therefore its capacity to retain heat, lower the paint quantity sprayed, and the film reticulation will be quicker, without a heat supplementary contribution.

In a gun spraying, maximum surface temperature enabling a correct spreading is at 250° C. Over it, it is difficult to obtain a smooth film with a correct finishing. However if the composition is diluted with a greater water quantity, and sprayed at full-rate flow, it is possible to apply onto surfaces up to 350° C.

When the metal surface is at a high temperature, over 40° C., the water, which is the solvent of the composition of present invention, evaporates quickly, depending on temperature. There is therefore an immediate increase in the viscosity of the product onto the surface. If the spraying continues, it will be possible to obtain a thick coating, without paint droppings or liftings.

In a normal painting process, this is not possible to obtain, because from 30-40 microns, paint lifts and drops obtaining irregular coatings. However, the fact that the composition of the coating can be applied onto hot surfaces, enables to obtain dry film thicknesses that can reach the 80 microns. The thickness will also depend of the material temperature and of its specific mass. Thus in cast parts being at 60°-80° C., it will be possible to obtain dry films superior to 100 microns.

If the anticorrosive qualities of the composition are already very high at normal thicknesses of 20 microns,, when laying a high thickness, even greater values are obtained. The edges of a piece are normally areas where the paint thickness is lower and therefore the areas with quicker corrosion, and with this procedure they will be coated with a thick layer, being effectively protected. Therefore with layers of 50 to 60 microns it is possible to obtain onto cool rolled steel, in the ASTM b-117 Salt Spray test, a corrosion progression on the cross inferior to 1 mm after more than 500 hours. As well, in cast pieces it is possible to reach 150 hours Salt Spray with a corrosion under the 5%, when in a conventional process there is a strong corrosion after 72 hours.

As already indicated, the composition object of present invention is applied directly onto the degreased metal surface without needing any prior pretreatment. The adherence of the coating makes the prior chemical conversion unnecessary, thus simplifying the operative process.

This implies important savings in energy, water, water treatment, and in space, because of suppressing the baths of chemical conversion, rinsing, and chromic passivation.

Any type of metal part suffering a prior heatening, up to a temperature of 250° C., can be coated with the composition object of present Invention. This heatening can be provoked, like in the case of the drying following a preparation or chemical conversion of the surface, or acquired in an operative process: coatings by dipping of cast metals, drawing, shotblasting, etc.

In a special way and for the novelty it represents, we point out the application onto hot dip galvanized strip, at the exit of molten zinc bath, when the material is at a temperature between 150° and 250° C. With present Invention we obtain the painting onto the galvanizing line, obtaining a film with high qualities in anticorrosive resistance, as well as in adherence and mechanical qualities, able to fulfil the quality standards established for the continuous painted steel strips (Coil Coating). This represents a great innovation as it has not been possible up to the moment to develop this technique. The french Patent 1.546.790 describes the application of paints, varnishes, glues, onto the hot dip galvanized band, but this process has not been used in the practice as an alternative of Coil Coating, only vindicating the use of calories and not a method to obtain painted plate with adequate anticorrosive and mechanical values, what will require to use very specific coating compositions, which are not described, as well as the qualities reached. Presently, when the galvanized steel bands have to be painted, it is done by a Coil Coating process, in installations independent from the galvanizing ones. These installations comprehend the surface preparation and pretreatment, with the corresponding rinsings. Afterwards there is a drying and the application of two paint layers, Primer and finishing Top Coat, each one followed by an ovening, to obtain the reticulation of the paint. The Coil Coating lines require a strong investment and the operative cost is very high.

The painting process on the same galvanizing line, described in present invention, enables, for certain applications, specially for materials foreseen for indoors, to avoid the Coil Coating systems, with the corresponding savings it represents. The conventional hot dip galvanizing lines, can then have the capacity of performing the strip painting and enlarging this way the commercial offer. In other cases it will enable, if the bands pass to a Coil Coating process, to obtain coatings of three layers, which are required for certain applications. In other cases, the Coil Coating lines having one sole painting step, can also obtain a two layer coating in a sole painting operation. Another important application from present Patent, is the possibility of painting very thick galvanized bands (superior to 1 mm), which cannot be painted by a Coil Coating process.

The coatings of steel with cast zinc of classic galvanizing baths, is the most representative example of the use of present invention onto continuous materials, but it is as well applicable after cast aluminium baths, zinc-aluminium alloys, with Galvalume (Bethlehem Steel), Galfan (Ilzro), and Monogal (Usinor), as well as in coatings of tin, lead and alloys.

In other cases the coating object of present patent enables to improve the paintability conditions of steels coated with zinc or zinc-aluminium alloys. The problems of these materials are well-known, when being painted, specially because of the blistering, when being submitted to alternative cycles of Salt Spray and extreme conditions of humidity/temperature. The coating of present invention can act as an isolating agent between the paint layers and the zinc or zinc-aluminium surface, avoiding the blistering. In order that the treatment composition could be applied properly onto a hot metal surface, not requiring at the same time the pretreatment or chemical conversion, it is necessary to fulfil some requirements which are met by present patent, as follows:

a) To be of aqueous medium, the volatile part being water. The reason of this is that the composition when being sprayed onto the hot surface will provoke an immediate evaporation of the thinner and dissolving fraction. Consequently, the organic solvents have to be avoided, because of the fire and contamination risks.

b) To have a high adherence onto metal surfaces, in order to make phosphating unnecessary. The coating has to provide phosphating qualities.

c) High anticorrosive resistance, even without prior phosphating, similar to a conventional organic coating, with the same thickness.

d) High physical and chemical qualities, excellent decorative aspect and ultraviolet rays resistance.

Up to the moment there is no vindication for any process using compositions like the ones described in present patent to be applied onto hot metal surfaces, and without prior chemical conversion. Compositions with a certain analogy have been described in some patents like: U.S. Pat. No. 3,053,693/U.S. Pat. No. 3,382,081/JP.50.158.835/U.S. Pat. No. 3,346,522/U.S. Pat. No. 3,181,596, pointing out their anticorrosive function or as a paint basis, exclusively.

The composition object of present patent contents the following basic elements:

a) Organic polymers in dispersion or aqueous emulsion specially copolymers of acrylic basis.

b) Mineral acid, specially phosphoric acid.

c) Hexavalent chromium.

d) Reducing agents, able to reduce total or partially the he xavalent chromium to trivalent chromium onto the hot metal surface.

e) Mineral or organic pigments dispersed in the aqueous medium.

f) Although not indispensable, certain cations are advisable, specially zinc. Trivalent chromium is also useful and in fact it can be added independently from the one that will be formed afterwards by reduction of hexavalent chromium.

g) For applications requiring a weldability, some conductors can be added such as metals finely divided like zinc, aluminium, iron, lamp black.

These different components solved or dispersed in an aqueous medium, which will provide a pH of 0.5 to 1.5, as being sprayed by means of aerographic or electrostatic gun, preferently high speed, onto hot metal surfaces between 40° and 250° C., will provide very adherent coatings, physico-chemical qualities, mechanical deformation and anticorrosive resistance.

The function of above mentioned components is following one:

The organic polymer of acrylic nature brings a very high resistance to humidity and ambient chemical agents. The monomers able of being used are the esters of acrylic acid metacrylic acid, such as ethyl acrilate, butil acrilate, metacrylic acid, styrene, glycidil acrilates.

The polymerization in aqueous dispersion will be made by means of traditional methods, selecting the emulgents preferently from the nonionic, anionic ones, because these mixtures, as already recognized in the bilbiography and in the practice, bring dispersions of high stability. It has been check ed that the polymere dispersions, capable of being used in present Patent, are those in which the molecular polymere weight is of about 1 million, and its fineness of 0.1 microns. These dispersions contain exclusively water as liquid fraction.

Phosphoric acid will provide the attack to metal surface, what ensures the anchoring of the coating, like Wash Primers do. At the same time it brings acidity to the aqueous medium, helping to the redox reaction described hereunder.

Hexavalent chromium, under the shape of chromates or chromic acid, also enables the chemical transformation of the zinc surface and brings its well known passivating qualities.

The function of the reducing agents is to achieve the reduction of hexavalent chromium to trivalent under the temperature action. This reduction is catalyzed by the acid pH. The most suitable reducing agents are those products, preferently of organic basis, presenting hydroxyl amine, aldehyde, keto groups, as well as those substances capable to generate with heat these funcitonal groups. Characteristic examples are the alcohols, polyalcohols, glycols, carbone hydrates, among the substances containing hydroxyle groups, and among those capable of decomposition by temperature, generating reducing compounds, we can mention organic acids like oxalic, tartaric, citric. Products formed in the oxidation of reducing agent have to be volatile at the temperature they are submitted, in order not to cause an hydrophilic action onto the coating film. For this reason products of short chains not ramified are prefered.

Preferently, the composition will contain reducing agents of short action, for a quick Redox reaction, as surface cools very quickly, generally. Although at first sight there is the incompatibility of the presence of an energic oxidizer like chromic acid or chromates, and a reducing agent of quick action, as they can react in the same composition with possibilities of altering or coagulating it, or of forming trivalent chromium precipitates, this is not important because the gun spraying systems enable to use two components, which are mixed in the gun head. Therefore the coating composition can be foreseen in two components, one containing the reducing agent, the other containing the chromates and chromic acid, as the contact time in liquid phase will be of few seconds, without so much risk of premature reaction between both components. Evidently, the formulation of this composition has prefered those reducing agents which can present more stability, inside the system.

Therefore the pigments can be of mineral nature like titanium dioxide, lamp black, metal oxides and others, including the ones of micaceous structure with metal and organic reflections like phtalociamines.

The presence of certain cations, without being fundamental, is advisable. Zinc is the most adequate for the galvanized steel coating, guaranteeing the formation of some first points of microcrystallization of zinc phosphates and chromates, highly protective, amortizing the residual acidity of phosphoric acid. Other cations can be incorporated, as we all know the protective effect of other phosphates and chromates like calcium, strontium, lead, aluminium, nickel, manganese, magnesium, etc. These cations are added under the shape of oxides, hydroxides, or carbonates, preferably. The trivalent chromium can also be included in this list and can be formed from hexavalent chromium by means of partial reductions with a reducing agent. Although it has been checked that the best results are obtained if the trivalent chromium formation is performed onto the galvanized band, the presence of a slight proportion of trivalent chromium in solution of about 10 to 20% of total chromium, can be beneficial As requiring a conductibility of the film, powder metal elements of lamp black are incorporated at a rate of 2 to 10%.

All these elements comprehended in the treatment composition, will be disposed preferently in two components or fractions, to avoid a premature reaction among them.

These two fractions will comprehend:
A. Organic Polymere in aqueous dispersion.
   Reducing agents
   Pigments
B. Hexavalent chromium
   Phosphoric acid
   Cations, like zinc, aluminium, nickel.

The preparation of every fraction will be made as follows:

FRACTION A—The reducing agent will be absolutely miscible or dilutable in water, like organic acids and polyalcohols.

They will be mixed in the aqueous dispersion of the organic polymere. This one will be of acrylic nature as above described.

Pigment will be dispersed in the aqueous phase, inside a system miscible with the resin in emulsion.

The most adequate quantity will be the one providing a full coloration to the metal surface, with thin coating layer (4–8 microns). The pigment percentage will then be of 10 to 15% in weight.

FRACTION B—The chromic acid (chromic anhydride) will be the most adequate substance to provide the hexavalent chromium ions, which will be incorporated to the phosphoric acid of 75%. When incorporating cations like zinc or others, zinc oxide or carbonate will be used, solved previously in phosphoric acid. If wishing to have available a low percentage of trivalent chromium, to the mixture of chromic and phosphoric acid will be added with or without cations, a small quantity of reducing agent such as methyl alcohol, which will reduce a fraction of hexavalent chromium to trivalent. The maximal quantity of trivalent chromium will be situated between 10 and 20%. The percentage of every component will be of:

| Chromic acid | 10 to 3% |
| Phosphoric acid | 5 to 2% |
| Zinc | 3 to 0% |
| Trivalent Chromium | 2 to 0% |

Both fractions will be mixed at use. It will be advisable to use the spraying systems enabling the mixture of the components in the head of the gun, what will prevent any premature reaction in the solution. The rates between fraction A and B will be 40/60 and 60/40. This mixture will contain a dry extract of about 20 to 30% in weight. Depending of the application, the surface temperature, the layer thickness to obtain, it will be diluted with more or less water. Thus for example, for the application onto just galvanized steel strips, the dry extract will be reduced to 15 to 25% in weight. The water quantity will be enough to obtain a uniform liquid film without failures onto the metal surface. This way, a uniform dry film will be obtained. On a surface at a very high temperature, if the composition is sprayed with not enough water, there will be an immediate evaporation, of every little drop sprayed so that it will not be possible to obtain a continuous film.

The spraying guns, aerographic or electrostatic, preferently high speed, will operate by an automatized system, and the installation will be leakproof to prevent the projection of particles and the eventuality of being inhaled bearing in mind its toxicity for the presence of hexavalent chromium. The residual sprays will be drawn to a water rinsing station with further reduction and precipitation of chromium and phosphates.

In its application onto pieces maintaining heat in their surface between 40° and 120° C., a sufficient quantity of composition will be sprayed to obtain layer thicknesses between 15 and 80 microns, as per the anticorrosive requirements and the capacity of heat retention of material. If the surface temperature does not reach 160° C., the piece will have to be heatened up to this temperature to reach the complete reticulation.

In the continuous galvanizing lines of steel strips, the spraying quantities will be regulated depending of the line speed and the film thickness to lay.

Layers of only 0.3 microns can be valid for protective coatings, of 0.5 microns for paint basis, and layers of 3 to 6 microns to obtain an adequate coating. If the plate has to be welded, it will be better not to surpass a thickness of 2 microns as due to the isolating character of the coating, welding would be difficulted or prevented. When the surface would be of an iron-zinc alloy, these values can be somewhat superior, of about 3 microns. The incorporation of lamp black and powder metals like zinc or aluminium, will enable to increase the layer thickness improving the weldability. As a maximal limit 8 to 10 microns will be laid. Over these values it is not advisable to work, so that the quantity of composition to spray is very high, what provokes a recooling of the strip, making the film curing difficult.

The different film thicknesses that can be obtained will depend above all of the concentration of product used, which will be maintained within the limits already pointed out, and afterwards of the equipment used, the application flows, the line speed, number of sprayers. As an example we can describe certain conditions enabling to obtain a dry film of 8 to 10 microns, using a high speed electrostatic spraying system; cup type projectors at 10.000 rpm, air pressure: 3 to 5 kgs/cm2, distance gun/strip: 150 to 250 mm, strip speed 45 to 50 m/mn, paint performance: 85% of paint laid.

The best strip temperature in the area where the composition will be sprayed, will depend of different parameters like the strip thickness, what affects the heat dissipation, the coating thickness to apply and the line speed.

Generally, this temperature is situated between 150° and 250° C., although in some cases, for very thin steel and high paint thickness, what would provoke an important heat loss, an additional heatening system will be necessary to recover the strip temperature, by means of a conventional system (infrared panels), or high frequence induction. Complete coating qualities will be obtained with only reaching this temperature.

At the exit of the spraying unit, the galvanized steel strip will be cooled by means of conventional processes, with air jet to pass to the skin-pass installations, and afterwards to the winding. In any case the above described paint composition, sprayed onto zinc and alloys coated band, maintaining a temperature between 150° and 250° C., enables to reach anticorrosive qualities of deformability and aspect, convenient for many industrial applications.

Other steel materials coated with zinc, like wire and tubes, can also be coated, at the exit of the zinc or alloys bath, taking advantage of the residual heat, with compositions like the ones described in present Patent.

The high temperature of the metal surface provokes the Redox reaction between the chromic acid and the chemical reducing agent. This temperature must be high enough to ensure the reduction of hexavalent chromium to trivalent one. The optimal quantity to reduce is between 90 and 95%. Under this quantity, the coating will maintain a water sensitivity what is checked when dipping a test-panel insufficiently reacted in water, what produces a decoloration of the coating and the water gets a yellow coloration as containing hexavalent chromium solved. It is advisable to maintain an hexavalent chromium fraction in the film, as it has been checked that the anticorrosive resistance is superior. If this hexavalent chromium quantity is under the 90%, it remains locked inside the film and does not dissolve in water, but in very aggressive mediums, like alkalines and strong acids capable to strip the film from metal support. The high anticorrosive resistance of these films is a consequence of the phosphochromatizing action onto metal surfaces and the formation in situ, when the film is cured, of trivalent chromium, reacting with the organic polymeres, giving closer structures and of high molecular weight, with high resistance to chemical and environmental agents, even superior to the one expected from an acrylic polymere, as hereunder detailed.

1ST EXAMPLE

Composition prepared with:

| Comp A | Acrylic polymere emulsion | 45 to 55% |
| --- | --- | --- |
| | Pigments (titanium oxide, iron oxide, charges, reducing Agents (polyalcohols) | 10 to 15% |
| | | 0,5 to 2% |
| | Water | 27 to 32% |
| Comp. B | Hexavalent chromium | 2 to 6% |
| | Phosphoric acid 75% | 2 to 8% |
| | Zn or other cations | 1 to 5% |
| | Water | 80 to 90% |

A mixture is prepared as per following rate:

| Comp. A | 25 to 40% |
| --- | --- |
| Comp. B | 25 to 40% |
| Water | 20 to 50% |

Which applied in above conditions onto galvanized surfaces, will give a coating of 0.3 to 1 micron with following features:
 OT bending=100% adherence.
 Ericks 8 mm drawing=100% adherence.
 Impact 85 cm ball 12.5 diameter=100% adherence.
 Anticorrosive resistance, ASTM B-117 Salt Spray=500 to 600 hours up to white rust.

2ND EXAMPLE

A mixture is prepared with components A and B, as above described, as per following rates:

| | |
|---|---|
| Comp. A | 35 to 45% |
| Comp. B | 35 to 45% |
| Water | 10 to 30% | which applied in above described conditions, onto galvanized surfaces, will provide a coating of 6 to 8 microns, with above mechanical features (example 1), and an anticorrosive resistance of 800 to 1000 hours in Salt Spray test, up to white rust.

3RD EXAMPLE

A composition prepared as indicated in example 2, applied onto zinc and aluminium alloy surfaces, laid in hot, in proportions of 95/5, Zn/Al and 45/55 Zn/Al, leaving a coating of 8 to 10 microns by means of above method. The anticorrosive resistance of the material thus prepared can be stated in 1000 hours of Salt Spray.

4th EXAMPLE

Composition prepared as follows:

| Component A | Acrylic polymere emulsion | 50 to 70% |
|---|---|---|
| | Pigments (titanium oxide, lamp black, and others) | 8 to 14% |
| | Extenders (BaSO4, Kaolin) | 3 to 5% |
| | Reducing agent (polyalcohol) | 0,5 to 3% |
| | Additives | 0,5 to 3% |
| | Water | 5 to 30% |
| Component B | Hexavalent chromium | 15 to 40% |
| | Phosphoric acid | 10 to 25% |
| | Zinc or other cations | 3 to 12% |
| | Water | 25 to 80% | which used at the use mixture of A/B=80/20 and applied onto hot metal surfaces, such as cold-rolled steel, produces a coating of 40 to 50 microns, of high anticorrosive qualities, of about 500 to 1000 hours in Salt Spray (ASTM-B-117), up to white rust.

In humidity chamber as per DIN 50017 it is superior to 1000 hours.

5TH EXAMPLE

Composition prepared as per example 4, used at a rate of a/B=80/20, which applied onto cast pieces at 60-80 microns. Curing the coating up to a temperature of 180° C., in Salt Spray, ASTM-B-117, we reach 150 to 200 hours up to corrosion. Similar parts, phosphated and painted with alkyd-melamine with a thickness of 30 microns, which cannot be increased, do not surpass the 50 hours in Salt Spray.

Sufficiently described the content of present Patent, it is understood that there is the possibility of introducing in it any modification of detail which would be estimated to be necessary, if not changing the essence of the Patent, which is resumed in following VINDICATIONS:

We claim:

1. A method for coating a metal surface, comprising: heating an untreated metal surface to a temperature of about 40° C. to 250° C. and spraying said metal surface while continuously moving said metal surface with a coating composition onto said hot untreated metal surface, whereby a corrosion resistant coating is formed on said metal surface, wherein said coating composition has a pH of about 0.5 to 1.5 and consisting essentially of by weight:
   (a) 20 to 40% acrylic organic polymer in aqueous dispersion;
   (b) 1 to 5% chromium, which is in a soluble form, and is selected from the group consisting of hexavalent chromium and mixtures of hexavalent and trivalent chromium, wherein about 0.1 to 20% of the total chromium in said mixture is trivalent chromium;
   (c) 1.5 to 4% phosphoric acid; and
   (d) 0.1 to 1.5% organic reducing agent.

2. The method of claim 1, wherein said coating composition further comprises 0.2 to 3% zinc ions.

3. The method of claim 2, wherein said coating composition further comprises pigment and weldable metal particles.

4. The method of claim 3, wherein said metal particles are selected from the group consisting of graphite, zinc, aluminum, iron and nickel.

5. The method of claim 4, wherein said metal surface is a member selected from the group consisting of steel, cast iron, and aluminum.

6. The method of claim 4, wherein said metal surface is a member selected from the group consisting of zinc, zinc-aluminum, and zinc-iron alloy.

7. The method of claim 1, wherein the said temperature is about 150° C. to 250° C.

8. A method for coating a metal surface, comprising: heating an untreated metal surface to a temperature of about 40° C. to 250° C. and spraying said metal surface while continuously moving said metal surface with a coating composition onto said hot untreated metal surface, whereby a corrosion resistant coating is formed on said metal surface, wherein said coating composition is applied in sufficient quantity to form a coating having a thickness of greater than 40 microns, has a pH of about 0.5 to 1.5 and consisting essentially of by weight:
   (a) 20 to 40% acrylic organic polymer in aqueous dispersion;
   (b) 1 to 5% chromium, which is in a soluble form, and consists of a mixture of hexavalent chromium and trivalent chromium, wherein about 0.1 to 20% of the total chromium in said mixture is trivalent chromium;
   (c) 1.5 to 4% phosphoric acid; and
   (d) 0.1 to 1.5% organic reducing agent.

9. The method of claim 8, wherein the said temperature is about 150° C. to 250° C.

10. The method of claim 8 wherein said coating composition further comprises 0.2 to 3% zinc ions.

11. The method of claim 10, wherein said coating composition further comprises pigment and weldable metal particles.

12. The method of claim 11, wherein said metal particles are selected from the group consisting of graphite, zinc, aluminum, iron and nickel.

13. The method of claim 12, wherein said metal surface is a member selected from the group consisting of steel, cast iron, and aluminum.

14. The method of claim 12, wherein said metal surface is a member selected from the group consisting of zinc-iron alloy.

* * * * *